(12) United States Patent
Chavda et al.

(10) Patent No.: US 10,361,944 B2
(45) Date of Patent: Jul. 23, 2019

(54) AUTOMATED TEST FOR UNIFORM WEB SERVICE INTERFACES

(71) Applicant: Oracle International Corporation, Redwood Shores, CA (US)

(72) Inventors: Brijeshkumar Chavda, Mountain House, CA (US); Viacheslav Skryabin, San Ramon, CA (US)

(73) Assignee: Oracle International Corporation, Redwood Shores, CA (US)

(*) Notice: Subject to any disclaimer, the term of this patent is extended or adjusted under 35 U.S.C. 154(b) by 593 days.

(21) Appl. No.: 14/681,996

(22) Filed: Apr. 8, 2015

(65) Prior Publication Data

US 2016/0299936 A1   Oct. 13, 2016

(51) Int. Cl.
| | |
|---|---|
| *G06F 11/00* | (2006.01) |
| *H04L 12/26* | (2006.01) |
| *H04L 29/08* | (2006.01) |
| *G06F 11/36* | (2006.01) |
| *G06F 16/958* | (2019.01) |

(52) U.S. Cl.
CPC .......... *H04L 43/50* (2013.01); *G06F 11/3672* (2013.01); *G06F 16/958* (2019.01); *H04L 67/02* (2013.01); *H04L 67/10* (2013.01)

(58) Field of Classification Search
CPC .............................. G06F 16/254; H04L 67/02
See application file for complete search history.

(56) References Cited

U.S. PATENT DOCUMENTS

| | | | | |
|---|---|---|---|---|
| 7,028,223 | B1 * | 4/2006 | Kolawa | G06F 11/3688 714/37 |
| 7,401,275 | B1 * | 7/2008 | Ku | G05B 19/41875 714/25 |
| 8,145,726 | B1 * | 3/2012 | Roche | G06F 11/3688 709/219 |
| 8,904,353 | B1 * | 12/2014 | Arguelles | G06F 11/3672 717/124 |
| 9,419,884 | B1 * | 8/2016 | Li | H04L 43/50 |
| 9,424,172 | B1 * | 8/2016 | Helder | G06F 11/3692 |
| 9,442,818 | B1 * | 9/2016 | Doe | G06F 11/3466 |
| 9,563,544 | B2 * | 2/2017 | Mecke | G06F 11/3688 |
| 9,672,139 | B2 * | 6/2017 | Peng | G06F 11/3664 |
| 9,727,445 | B2 * | 8/2017 | Simernitski | G06F 11/3664 |
| 9,842,045 | B2 * | 12/2017 | Heorhiadi | G06F 11/3692 |
| 2004/0003033 | A1 * | 1/2004 | Kamen | G06F 17/3089 709/203 |
| 2004/0060057 | A1 * | 3/2004 | Hansen | H04L 29/06 719/328 |

(Continued)

*Primary Examiner* — Loan L. T. Truong
(74) *Attorney, Agent, or Firm* — Kraguljac Law Group, LLC

(57) ABSTRACT

A method of automated testing of a Web Service public interface may include retrieving a first data set from the Web Service. The first data set may include information for accessing individual data records stored by the Web Service. The method may also include retrieving a second data set from the Web Service. The second data set may include a data model for the individual data records. The method may additionally include retrieving a first data record from the Web Service using the information for accessing individual data records. The method may further include verifying that the first data record retrieved from the Web Service is correct by comparing fields in the first data record with the data model.

20 Claims, 9 Drawing Sheets

(56) References Cited

U.S. PATENT DOCUMENTS

| | | | | |
|---|---|---|---|---|
| 2004/0199364 A1* | 10/2004 | Law | ............ | G05B 9/02 702/189 |
| 2004/0199818 A1* | 10/2004 | Boilen | ............ | G06F 11/36 714/25 |
| 2005/0125271 A1* | 6/2005 | Peltz | ............ | G06Q 10/06313 705/7.23 |
| 2005/0154939 A1* | 7/2005 | De Pauw | ............ | G06F 11/3688 714/25 |
| 2005/0268165 A1* | 12/2005 | Betts | ............ | G06F 11/0709 714/18 |
| 2007/0261124 A1* | 11/2007 | Centonze | ............ | G06F 21/6227 726/27 |
| 2008/0066009 A1* | 3/2008 | Gardner | ............ | G06F 8/34 715/809 |
| 2008/0085502 A1* | 4/2008 | Allen | ............ | G06Q 10/10 434/365 |
| 2008/0154663 A1* | 6/2008 | Savur | ............ | G06Q 10/06311 705/7.13 |
| 2009/0063504 A1* | 3/2009 | Banister | ............ | G06F 17/30563 |
| 2009/0164621 A1* | 6/2009 | Kothari | ............ | H04L 43/00 709/224 |
| 2009/0172153 A1* | 7/2009 | Cohen | ............ | H04L 67/02 709/224 |
| 2009/0235172 A1* | 9/2009 | Gandhi | ............ | G06F 11/3688 715/733 |
| 2010/0095161 A1* | 4/2010 | Giat | ............ | G06F 11/3688 714/45 |
| 2010/0131928 A1* | 5/2010 | Parthasarathy | ............ | G06F 11/3664 717/126 |
| 2010/0306590 A1* | 12/2010 | Anand | ............ | G06F 11/3664 714/32 |
| 2011/0055134 A1* | 3/2011 | Dvorak | ............ | G06F 11/2294 706/47 |
| 2011/0106617 A1* | 5/2011 | Cooper | ............ | G06Q 30/02 705/14.49 |
| 2011/0224946 A1* | 9/2011 | Brayman | ............ | G06F 11/3419 702/176 |
| 2011/0270748 A1* | 11/2011 | Graham, III | ............ | G06Q 20/102 705/40 |
| 2011/0307860 A1* | 12/2011 | Park | ............ | G06F 8/30 717/107 |
| 2012/0059919 A1* | 3/2012 | Glaser | ............ | G06F 11/3664 709/223 |
| 2012/0158911 A1* | 6/2012 | Leiba | ............ | H04L 41/5096 709/219 |
| 2012/0284719 A1* | 11/2012 | Phan | ............ | G06F 9/4843 718/101 |
| 2012/0290527 A1* | 11/2012 | Yalamanchilli | ... | G06F 17/30592 707/602 |
| 2013/0152047 A1* | 6/2013 | Moorthi | ............ | G06F 11/368 717/124 |
| 2013/0174126 A1* | 7/2013 | Belihomji | ............ | G06F 11/3668 717/127 |
| 2013/0198568 A1* | 8/2013 | Ahmed | ............ | G06F 11/3688 714/32 |
| 2014/0082749 A1* | 3/2014 | Holland | ............ | G06F 21/645 726/29 |
| 2014/0283080 A1* | 9/2014 | Beskrovny | ............ | G06F 21/577 726/25 |
| 2014/0289702 A1* | 9/2014 | McMahon | ............ | G06F 21/60 717/120 |
| 2014/0304678 A1* | 10/2014 | Zhang | ............ | G06F 8/36 717/105 |
| 2014/0310564 A1* | 10/2014 | Mallige | ............ | G06F 11/0781 714/47.1 |
| 2014/0380267 A1* | 12/2014 | Fiebig | ............ | G06Q 10/06 717/104 |
| 2015/0088974 A1* | 3/2015 | Anderson | ............ | G06F 17/3089 709/203 |
| 2015/0169432 A1* | 6/2015 | Sinyagin | ............ | G06F 11/3684 717/124 |
| 2016/0011951 A1* | 1/2016 | Beskrovny | ............ | G06F 11/3684 714/37 |
| 2016/0148130 A1* | 5/2016 | Krishnan | ............ | G06F 16/27 705/7.27 |
| 2016/0219143 A1* | 7/2016 | Zilles | ............ | H04M 3/242 |
| 2016/0239409 A1* | 8/2016 | de Oliveira Staudt | ............ | G06F 11/3684 |
| 2017/0177826 A1* | 6/2017 | Alexander | ............ | A61B 5/16 |
| 2018/0020074 A1* | 1/2018 | Ainsworth | ............ | H04L 67/2819 |
| 2018/0077132 A1* | 3/2018 | Pandian | ............ | H04L 63/08 |
| 2018/0091414 A1* | 3/2018 | Viswanathan | ............ | H04L 43/50 |

\* cited by examiner

AUTOMATED TEST FOR UNIFORM WEB SERVICE INTERFACES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Generally, a web service is a method of communication between two computer devices over a network. In the context of the Internet, a web service has an interface described in a machine-processable format, such as the Web Service Description Language (WSDL). Other systems interact with the web service in a manner defined by its interface using standardized protocols, such as the Simple Object Access Protocol (SOAP). Data sent and received are typically conveyed using HTTP with an XML serialization in conjunction with other web-related standards. Web services allow different software systems to exchange data with each other by defining a service requester and a service provider. The WSDL interface can define how the service requester can request data from the service provider, which specific parameters are required as part of the request, and the structure of data produced by the service provider.

Recently, web services have been moving to simpler representational state transfer (REST)-based communications. In conforming with REST concepts, APIs do not require XML-based Web service protocols (e.g., SOAP and WSDL) to support their interfaces. REST is a simpler alternative to SOAP/WSDL-based services, and represents a coordinated set of constraints for creating scalable web services and maintainable architectures.

BRIEF SUMMARY

In one embodiment, a method of automated testing of a Web Service public interface may be presented. The method may include retrieving a first data set from the Web Service. The first data set may include information for accessing individual data records stored by the Web Service. The method may also include retrieving a second data set from the Web Service. The second data set may include a data model for the individual data records. The method may additionally include retrieving a first data record from the Web Service using the information for accessing individual data records. The method may further include verifying that the first data record retrieved from the Web Service is correct by comparing fields in the first data record with the data model.

In another embodiment, a non-transitory computer-readable medium may be presented. The computer-readable memory may comprise a sequence of instructions that, when executed by one or more processors, cause the one or more processors to perform operations including retrieving a first data set from the Web Service. The first data set may include information for accessing individual data records stored by the Web Service. The operations may also include retrieving a second data set from the Web Service. The second data set may include a data model for the individual data records. The operations may additionally include retrieving a first data record from the Web Service using the information for accessing individual data records. The operations may further include verifying that the first data record retrieved from the Web Service is correct by comparing fields in the first data record with the data model.

In yet another embodiment, a system may be presented. The system may include one or more processors and a memory communicatively coupled with and readable by the one or more processors. The memory may comprise a sequence of instructions which, when executed by the one or more processors, cause the one or more processors to perform operations including retrieving a first data set from the Web Service. The first data set may include information for accessing individual data records stored by the Web Service. The operations may also include retrieving a second data set from the Web Service. The second data set may include a data model for the individual data records. The operations may additionally include retrieving a first data record from the Web Service using the information for accessing individual data records. The operations may further include verifying that the first data record retrieved from the Web Service is correct by comparing fields in the first data record with the data model.

In implementations of the above-described embodiments, one or more of the following features may be included in any combination and without limitation. The method/operations may also include successively retrieving each data record available from the Web Service using the information for accessing individual data records; and verifying that each retrieved data record is correct by successively comparing fields in each retrieved data record with the data model. The method/operations may additionally include determining that a first field in the first data record comprises one or more references to data records provided by one or more additional Web Services; and recursively traversing each of the one or more references to data records until each of the one or more additional web services have been tested. The method/operations may further include verifying that the Web Service correctly retrieved the first data record by comparing the data types of the fields in the first record with the data types from the second data set. The method/operations may also include altering a first field in the first data record, where a data type from the second data set for the first field indicates that the first field may not be updateable; updating the first data record in the Web Service with the altered first field; retrieving the first data record from the Web Service; and verifying that the first field in the first data record is not altered. The method/operations may additionally include recursively retrieving each data record available from the Web Service; and generating a demo data bundle that is stored in a local memory. The method/operations may further include operating a software application, where the software application includes a first operating mode where the software application accesses the Web Service to retrieve data records, and where the software application includes a second operating mode where the software application accesses the local memory to retrieve data records from the demo data bundle. Comparing fields in the first data record with the data model may include determining that a first field in the first data record is required according to the data model; and verifying that the first field is associated with a valid value.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
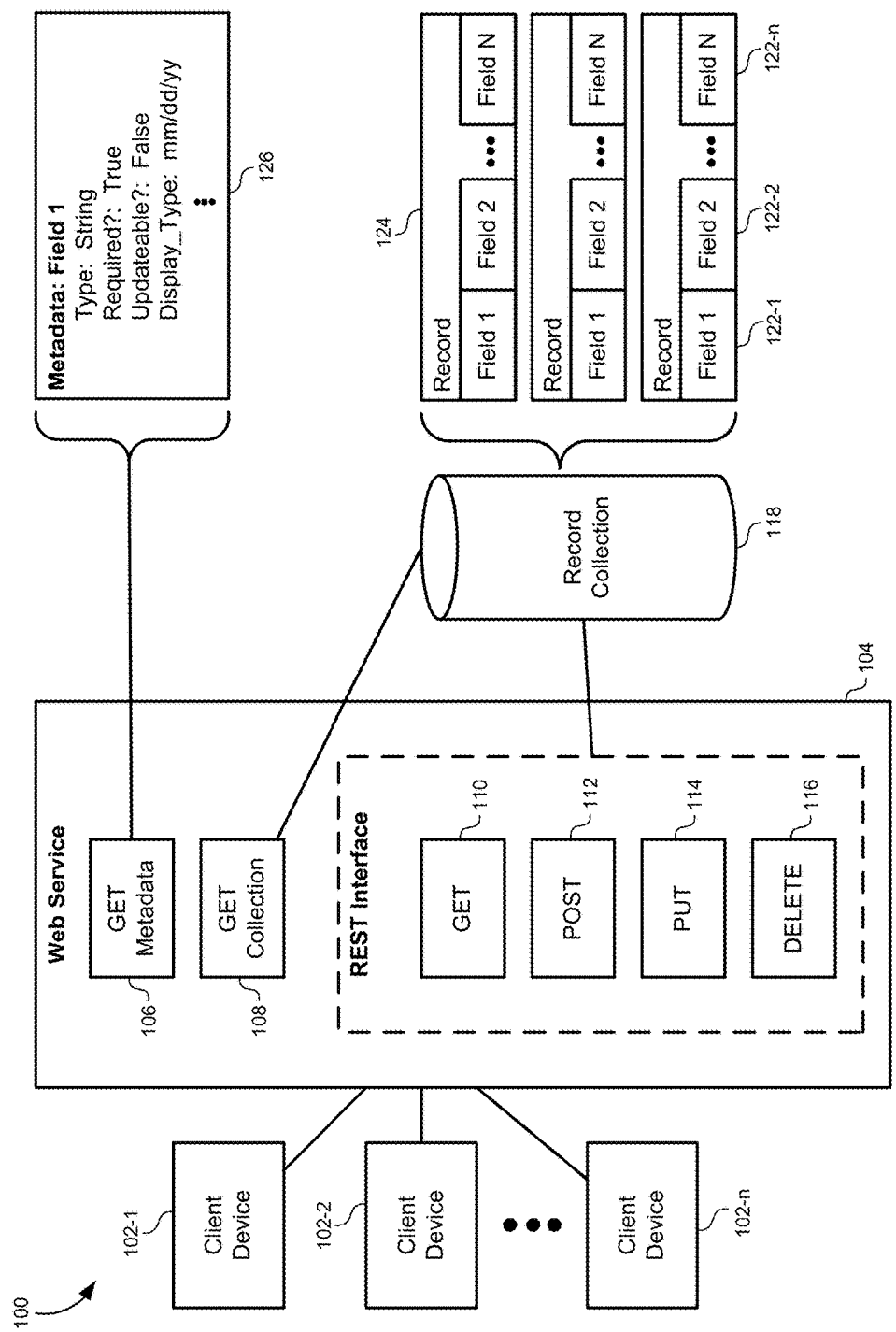
FIG. 1 illustrates a block diagram of a back-end system for a public web service interface that conforms to a predefined standard, according to one embodiment.

Modern web services often conform to industry standards and thereby provide structured, well-known interfaces. However, behind the public interface, Web services can provide access to vast and diverse collections of information often resulting in complicated software architectures. For example, software architectures may include database systems, database management systems, enterprise software systems, data processing platforms, and so forth. Thus, while appearing simple at the interface, Web services often mask a complex back-end system that can—like any complex software system—require a large amount of testing, data verification, and maintenance.

For example, an Enterprise Software System may include numerous web services based on the REST protocol, which provides a standard for the verb-interface commands GET, PUT, POST, and DELETE. In a large system, web services can be exposed as REST endpoints that conform to a specific API contract. A test client, a mobile application, a desktop workstation, and/or any other computing device can act as a client to make requests from the REST endpoints which will generate a response in, for example, a JSON format. These requesting clients can render a User Interface (UI) based upon a response returned using parameters obtained from the web services, such as a UI metadata model. In some web services, a data metadata model and a link relations metadata model may also be available.

The embodiments described herein present a Test Anything Protocol (TAP) system that can interface with and automatically test any web service conforming to a predefined API contract. The basic assumption behind TAP is to separate the test execution procedures from the raw data generated from the test. As used herein, the term "test system" will be used to describe a computer system or server that is connected to a web service and which performs an automatic test of the web service functions and data through the predefined API contract interface. By way of example, some embodiments herein may specifically refer to web services that conform with the REST protocol. However, all embodiments are not so limited, and one having skill in the art will readily understand that the test system and procedures described herein can be modified to conform to any web service interface. Therefore, the REST protocol is merely exemplary and not meant to be limiting.

In some embodiments, the test procedures will begin by retrieving information from the web service that can be used for accessing individual data records stored by the web service. For example, the test system can retrieve a data collection from the web service that lists identifying information for each object in a stored collection. Additionally, the test system can retrieve information that describes datatypes for fields in the individual data records of the stored collection from the web service. For example, the test system may retrieve metadata that describes a data model, or data format for each record stored in the collection, including a data type, a data length, values specifying whether the field is required, editable, and/or updatable, and so forth. Using this information, the test system can then repeatedly query the web service to extract each data record stored therein. The test system can then validate each retrieved record against the metadata. For example, the test system can determine whether all required fields are populated with valid values. The test system can also ensure that datatypes match between the metadata and the retrieved record. As will be described further below, the test system can also edit records, then POST/PUT these records back into the web service and verify that these operations were successful. The web service can create dummy records, delete records, and otherwise test all the functionality presented by the predefined API contract of the web service such that all of the data stored by the web service can be validated. By validating the data, the functionality of the back-end system of the web service can be thoroughly tested through the public interface.

The advantage of this system is that the test procedure can operate largely independent of the type of data provided by the web service. Using the standard GET, PUT, POST, and DELETE prefixes, the test system can retrieve the data model from the web service and collection information that defines how each data record can be accessed. Using this information, the test system can then query the web service, retrieve data records, compare them to the data model, update the records in the web service, add dummy records, delete dummy records, and so forth, all without needing to understand what is represented by the data. This flexible test system can therefore be attached to any web service conforming to a standard API contract (e.g. REST) in order to exhaustively test all corner cases in the provided data sets.

FIG. 1 illustrates a block diagram 100 of a back-end system for a public web service interface that conforms to a predefined standard, according to one embodiment. Client devices 102 can interface with the web service 104 using the REST interface, which provides access commands prefixed with GET 110, POST 112, PUT 114, and/or DELETE 116 for accessing data stored in a record collection 118 in a backend of the web service 104. The record collection 118 may be stored in a database, such as the databases provided by Oracle®. The record collection 118 can store a plurality of records 124, each of which stores a plurality of fields 122. By way of example, each record may represent an employee record, and each field 122 may represent information such as an employee number, a name, an email address, a job title, and so forth. Each of these records may be accessed, retrieved, updated, and added via the REST interface.

In addition to providing standard access to the plurality of records 124, the web service 104 may also provide methods for retrieving a data model for the plurality of records 124. For example, the web service 104 may provide a GET metadata 106 method that returns a data model 126 (also simply referred to as metadata) for the plurality of data records 124. The data model 126 may include metadata specific to each field 122 in the plurality of records 124. By way of example, a field 122-1 representing an employee first name (FIRST_NAME) may include metadata such as a data type (string), a display type for formatting the display of the first name, an updatable (T/F) flag specifying whether the POST 112 method is allowed to update the field, a required (T/F) flag specifying whether the PUT 114 method is allowed to add a new record without this field, a UI data model for displaying the field on various platforms (mobile, HD, etc.), along with other metadata specifying whether the field is indexable, filterable, and so forth. The data model 126 may generally be referred to herein as information describing data types and formats for the plurality of records 124.

The web service 104 may also provide methods for retrieving information about the record collection 118. A GET collection 108 method may return at least a part of the plurality of records 124, depending on how the web service 104 is implemented. In some embodiments, the GET collection 108 method can return an enumeration of each record in the record collection 118. In other embodiments, variations of the GET collection 108 method may return information for accessing each record in the record collection 118 without returning all of the data in the record collection 118. For example, the GET collection 108 method may return a record identifier for each of the plurality of records 124, such as an employee identification number. The enumeration of record identifiers may then be used to iteratively access each of the plurality of records 120 for the record collection 118. For example, a GET 110 command may be generated to perform an operation such as "GET Employee ID=1236642."

Using the standard REST interface, the GET metadata 106 method, and the GET collection 108 method, the test system can learn enough information from the public API of the web service 104 to first retrieve each individual record from the record collection 118 and verify the operation of the web service 104 by validating each accessed data record against the data model.

Figure 2:
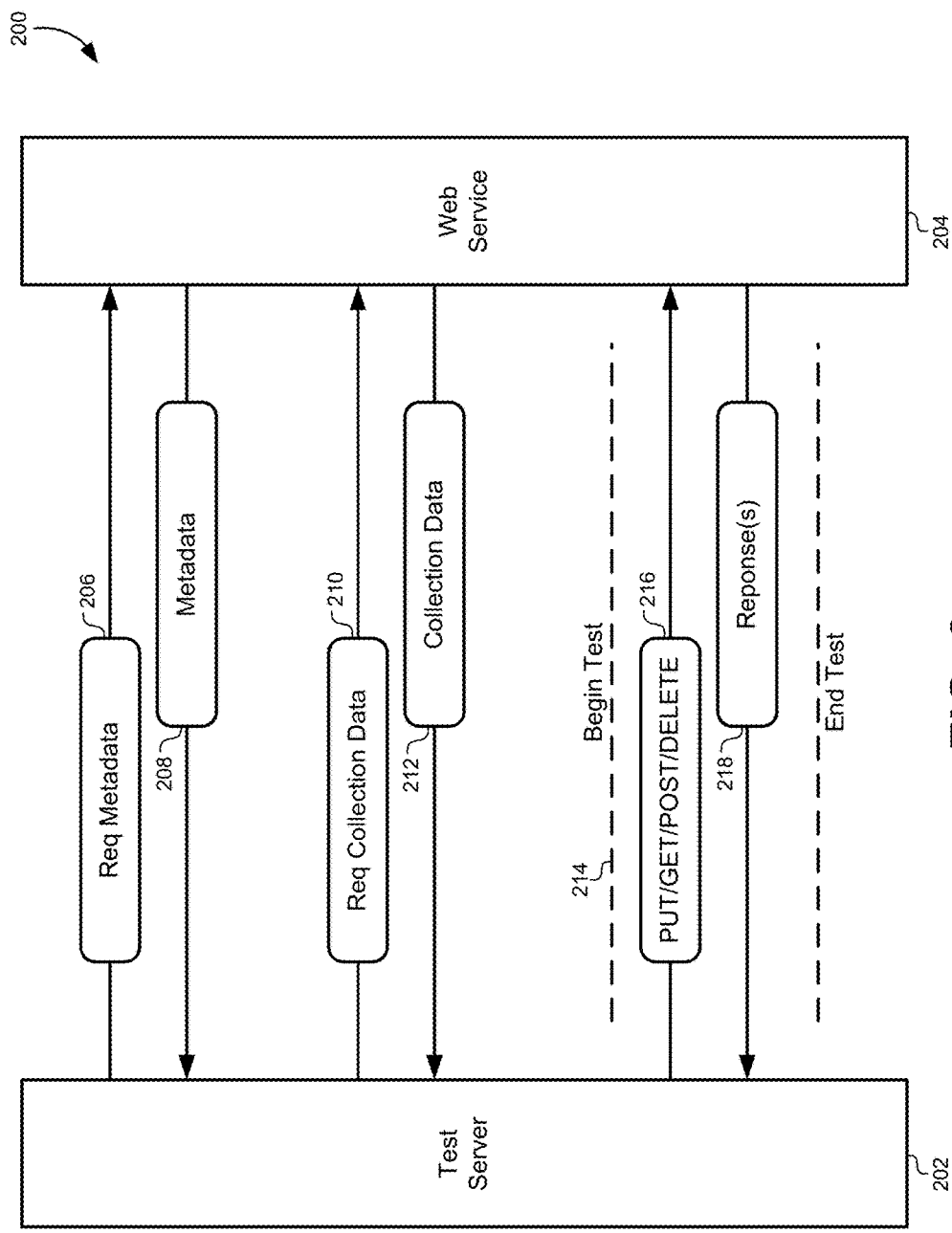
FIG. 2 illustrates a flow diagram of an automated test system for a web service, according to some embodiments.

FIG. 2 illustrates a flow diagram 200 of an automated test system for a web service, according to some embodiments. The test system may include a test server 202 that interfaces with the web service 204. During testing, the test server 202 may appear to the web service 204 as any other client device that is simply accessing data through the web service 204. Before testing can begin, the test server can request metadata 206 from the web service 204. The web service 204 can provide the metadata 208 which includes a data model for each of the records provided by the web service 204. Additionally, the test server 202 may request collection data 210 from the web service 204. The web service 204 can provide collection data 212 to the test server 202 that includes at least information for accessing individual records within the record collection provided by the web service 204. It should be noted that requesting metadata 206 and requesting collection data 210 can be carried out in any order and is thus not limited to the order illustrated by FIG. 2.

Once the test server 202 has a data model provided by the metadata and has information for accessing individual data records in the collection data 212, an iterative testing process may begin 214. Many different combinations of accessing data (e.g. PUT, POST, DELETE, GET) may be provided by the test server 202. In some embodiments, the test server 202 can be provided with inputs that define a level of testing to be performed. In general, each step of the test will be comprised of at least one PUT/POST/DELETE/GET command 216 sent from the test server 202 to the web service 204 and at least one response 218 sent from the web service 204 to the test server 202. In most cases, the test server 202 will compare the response 218 from the web service 204 with an expected response by analyzing the content of the data in the response 218 and/or the format of the data in comparison to the expected data model provided by the metadata 208.

A first test level may include iteratively retrieving (e.g. GET) each data record provided by the web service 204 and validating the provided data record against the data model provided in the metadata 208. Continuing with the example of employee records, the test server 202 can iteratively request each employee record using an employee ID provided by the collection data 212. As each employee record is received, the individual fields within the employee record can be validated against the metadata. For example, "required" (T/F) fields can be checked to see if they include valid values. Fields can be compared against expected data types to ensure that they include valid words/numbers/Boolean values and so forth. Some data models may also include status codes and headers that should be present in a response from the web service. These can also be validated during the first test level. This first level of testing is meant to ensure that the data stored by the web service 204 conforms to its own requirements. It also verifies that the web service 240 is storing data correctly, assuming that the data were originally provided to the web service correctly. Because this level of testing is fast and lightweight, it can be used by developers before developing code or as part of an acceptance test after each deployment/release/update. As will be described further below, this first level of testing may also include a flag specifying that the results can be formatted as either a test report, or as a demo bundle.

A second test level may include all the processes from the first test level, as well as additional processes. This second level of testing can provide full support and verification of positive CRUD (create, read, update, delete) operations on each data record without needing to manually create and write scenarios specific to the web service. As with the other examples described herein, the CRUD operations can be represented by the REST interface. The second level of testing goes beyond the simple GET verification, and utilizes the PUT, POST, and DELETE commands for additional verification. Generally, by looking at the list of allowed actions in the data model, the test server can automatically generate test data against these allowed actions and determine if the web service 204 is operating correctly. For example, the test server 202 can make a POST call with all required fields creating an additional record in the record collection of the web service 204. Then, a subsequent GET command will verify that the record was created in the record collection correctly. A DELETE command can be used on the newly created record to verify that the delete is working and to restore the record collection to its proper state. In some cases, the data collection information can be retrieved again to ensure that the contents of the record collection are completely restored after the testing process.

In some embodiments, a PUT command can be used to change an updateable field with random values based on the allowed data types as specified by the data model. A subsequent GET command can be used to ensure that the fields have been changed accordingly. A PUT command can be used again restore the initial state of the data before they were changed. This can be used to verify that the web service 204 is correctly enforcing the data model on PUT/POST commands, regardless of the data model. Besides the "updatable" flag, other attributes from the data model can also be tested. For example, to test the "required" field, the test server 202 can generate a new data record that leaves a "required" field blank. A subsequent POST command can be used to verify that the web service 204 rejects a data record with a missing "required" field. In a general sense, the test server 202 can take any Boolean-valued attribute from the data model and test the positive/negative condition. The test server 202 can POST both valid and invalid data and use a subsequent GET command to verify that the web service 204 behaved appropriately by either allowing or disallowing the POST command.

A third test level may include all of the processes from the first and/or second test levels, as well as additional processes. In some embodiments, the third test level can also perform negative testing of the CRUD operations. For example, the test server 202 can perform random requests to an object with disallowed data types. For example, an empty field may require a NULL value, while other empty fields may require a "0.0" value, depending on the data type. The test server 202 can first look for corner cases where errors are most likely to occur. Specifically, the test server 202 can identify cases where records we formatted somewhat differently in XML and JSON formats. At each of the three testing levels, the data collection information can be used to exhaustively checked each data record in the record collection at each of the three levels.

Figure 3:
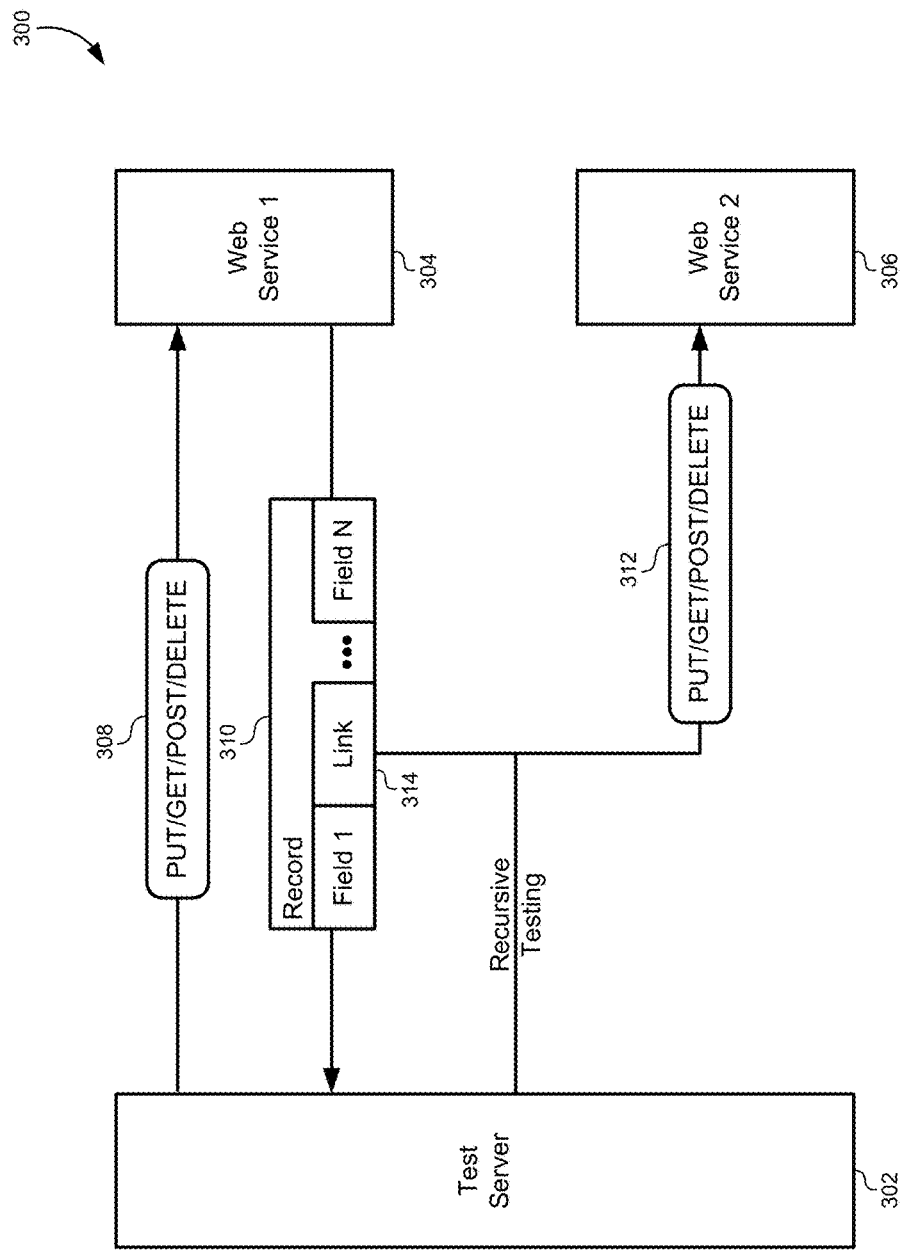
FIG. 3 illustrates a block diagram of recursively testing links between web services, according to some embodiments.

FIG. 3 illustrates a block diagram 300 of recursively testing links between web services, according to some embodiments. The data models for some web services may be quite complex and may include links to other data records. For example, a test server 302 applying test commands 308 to a first web service 304 may receive a record 310 that includes a link 314 to a data record in either the first web service 304 or a second web service 306. Continuing with the example of employee records, a particular employee record may include a link to a second web service that provides timecard data.

In order to fully test the data in the first web service 304, the test server 302 can recursively dereference any links to the same or other web services found in any records returned from the first web service 304. In some embodiments, this may correspond to a fourth level of testing such that recursive dereferencing of links can be selected based on the test requirements. In some embodiments, the test server 302 can provide a second set of test commands 312 to the second web service 306 as soon as the link 314 is found in the record 310 returned while testing the first web service 304. Although not shown explicitly in FIG. 3, the data returned from the second web service 306 as part of the recursive testing may also include additional links to data records in these or other web services. As part of the recursive testing scenario, these links may also be dereferenced and tested according as part of the test procedure for the first web service 304. In some embodiments, referencing a single record in the second web service 306 may trigger an exhaustive test of every data record in the second web service 306, such that the test server 302 retrieves metadata including a data model, data collection information, and iteratively PUTs/GETs/POSTs/DELETEs each of the records provided by the second web service 306. Alternatively or additionally, referencing a single record in the second web service 306 as part of testing the first web service 304 may only require that the single record be tested according to the test level of the first web service 304. For example, if the first web service 304 is being tested at the second test level, then the record retrieved via the link 314 from the second web service 306 would be tested at the second test level.

Figure 4:
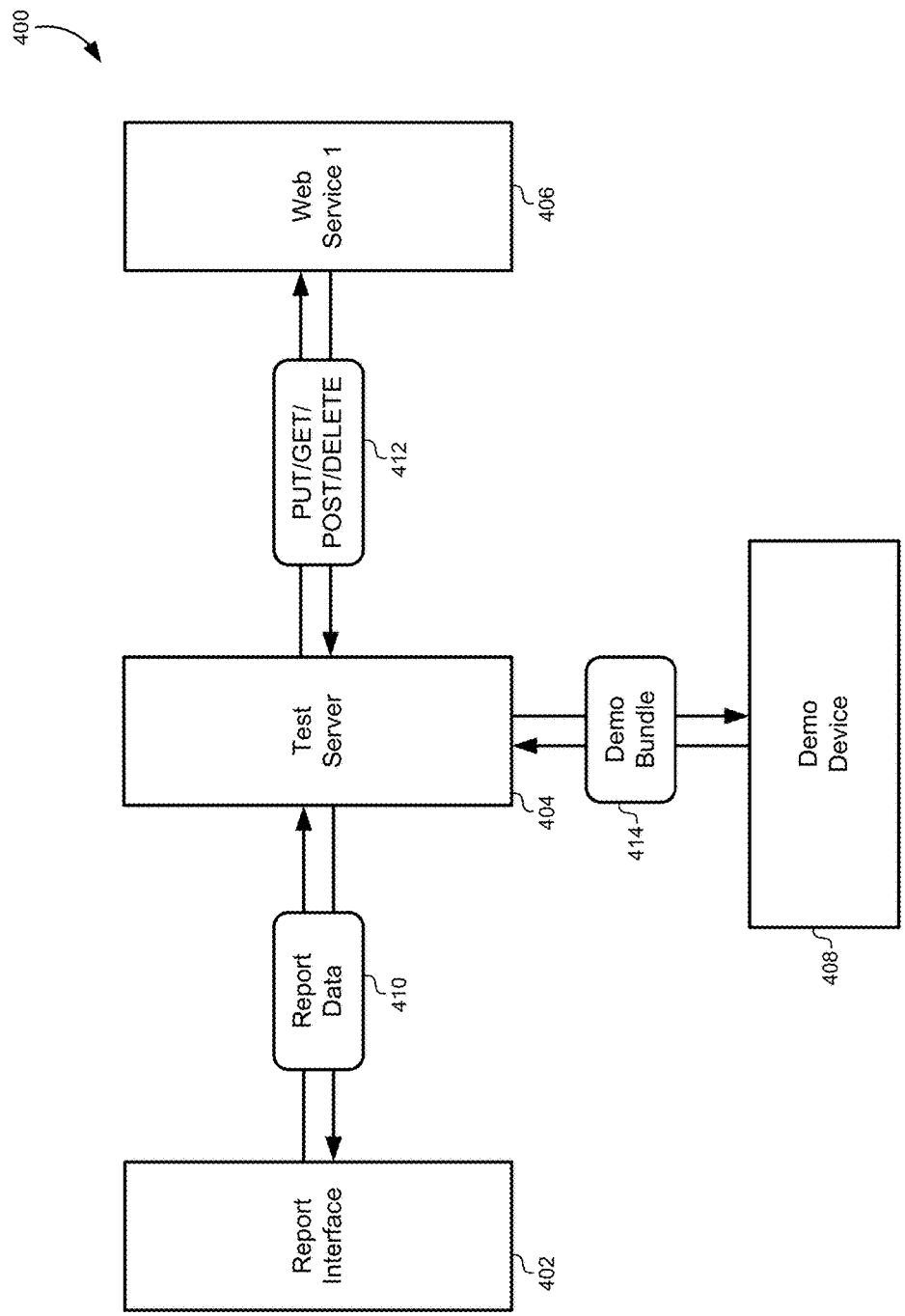
FIG. 4 illustrates a block diagram of a system for generating report data and/or demo bundle data, according to some embodiments.

FIG. 4 illustrates a block diagram 400 of a system for generating report data and/or demo bundle data, according to some embodiments. Test results can be formatted and used in a number of different ways by the test server 404. After providing test commands and receiving results 414 from the web service 406, the test server 404 may generate report data 410 to be sent to a report interface 402. The report interface can describe any errors that were encountered during testing, as well as diagnostic data from the first web service 406, such as total number of records accessed, test time, testing level, test functions performed, and so forth. Generally, the report data 410 can summarize the results of the test and provide these results to the report interface 402, which will format the report data 410 in a way that can be easily digested by the user.

In some embodiments, the test server 404 can generate a demo bundle 414 from the results 412 of the automated tests. When demonstrating the functionality of the web service 406 for clients and/or consumers, it may be useful to provide a local demo bundle 414 that includes all of the data provided by the web service 406. During the demonstration, the demo bundle 414 can be accessed instead of having to communicate with the web service 406 over the Internet. Modern history is full of many different instances where a product demonstration was ruined by a faulty Internet connection, a server being down for maintenance, and/or any other network related complication that prevented communication with the web service 406. The demo bundle 414 can be used to demonstrate the functionality of the software in interacting with data provided by a web service without the complication of Internet connectivity.

Software on a demonstration device 408 can include two different settings: a normal, Web-based setting; and a demonstration setting. During the web-based setting, the demo device 408 can interact with the web service 406 through the Internet as usual. During the demonstration setting, the demo device 408 can interact with a locally stored demo bundle 414 that can be stored on the demo device 408 or on a server accessible through a local network. The demo device 408 or the local server can provide a web interface that mimics that of web service 406 such that the demo device 408 can access the contents of the data bundle 414 in the same manner that it would access the record collection of the web service 406. To the software operating on the demo device 408, accessing data from the demo bundle 414 is transparent, such that it appears to the software that data records were being retrieved from the web service 406.

Figure 5:
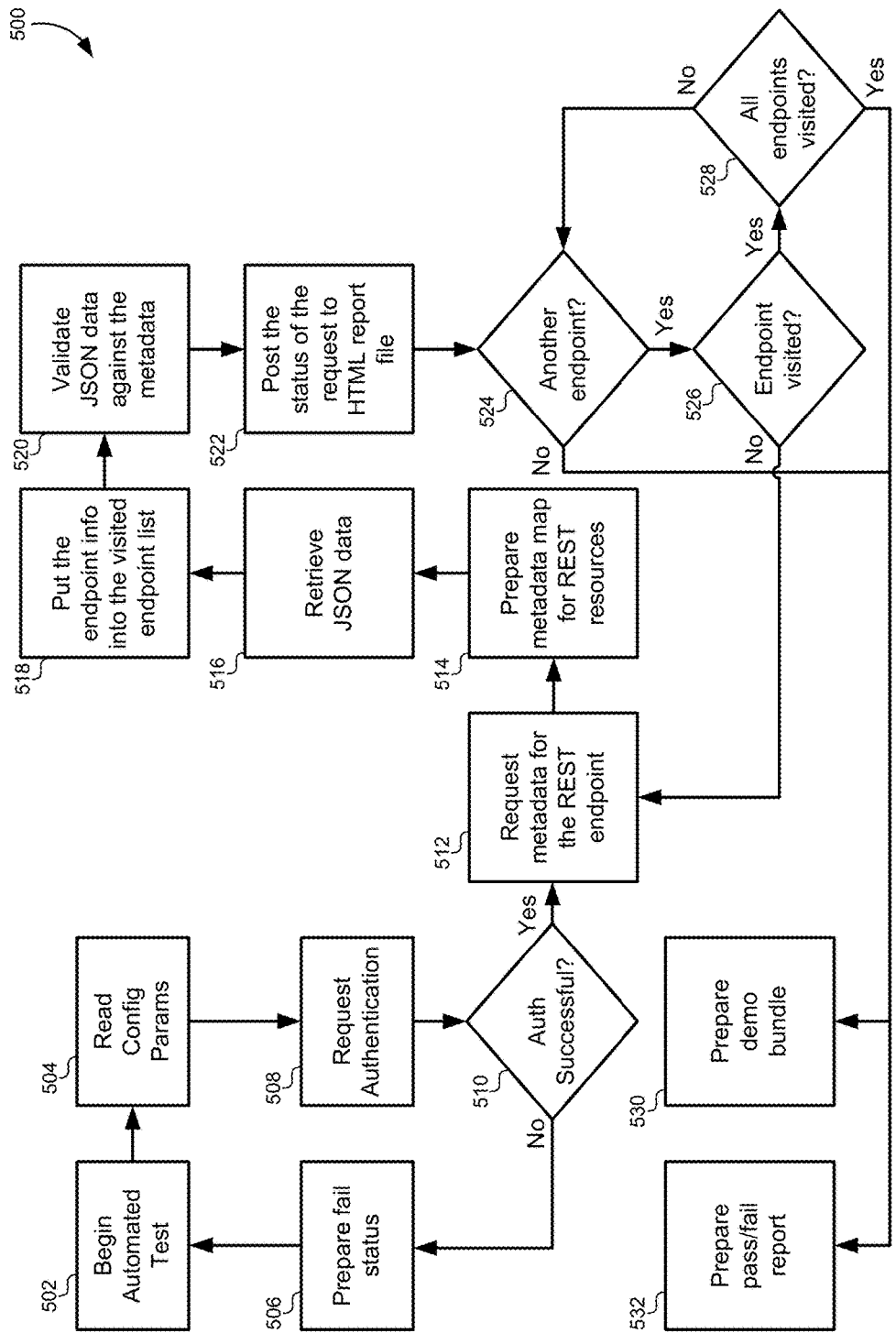
FIG. 5 illustrates a flowchart of a method for automatically testing a web service, according to some embodiments.

FIG. 5 illustrates a flowchart 500 of a method for automatically testing a web service, according to some embodiments. Flowchart 500 is a very specific implementation of the test system described above that deals with a REST interface and provides JSON-formatted data records. When the automated test begins (502), the test system can read configuration parameters from a configuration file (504) that describe how the test should be conducted. For example, the configuration parameters can specify the level of testing to take place, a URL for the web service, an authentication token to be used to log into the web service, and so forth. The test system can then access the web service using the URL from the configuration parameters and request authentication using the authentication token (508). If the authentication fails, the test system can generate a status report that indicates the authentication failure (506).

If the authentication is successful (510), then the test system can request metadata from the REST endpoint, i.e. the web service (512). One embodiment may use the HTTP command GET {domain}/{context}/{version}/{dataModelEndpoint} in order to access the metadata of the web service. For a web service that provides information related to requisitions, the command could be: GET https://tbe.taleo.net/CH01/ats/api/v1/requisitions. In response, the web service could provide a JSON-formatted object (516), such as:

```
{"resources": [
    {"name": "tbeRequisition",
    "displayLabel": "Requisition",
    "pluralDisplayLabel": "Requisitions",
    "precache": true,
    "groupBy": "Work",
    "position": 2,
    "baseURL": "https://tbe.taleo.net/CH01/ats/api/v1",
    "links":
        {"self":
            {"href": "/resources/tbeRequisition",
            "rel": "/linkRelations/common/self"},
        "icon":
            {"href": "/icons/shuttle-requisition",
            "rel": "/linkRelations/common/icon"}},
    "model":
        {summariesVersion": "1",
        "detailsVersion": "1",
        "links": {
        "describedBy":
            {"href": "/resources/tbeRequisition/model",
            "rel": "/linkRelations/common/describedBy"},
        "list":
            {"href": "/requisitions",
            "rel": "/linkRelations/tbeRequisition/list"},
        "details":
            {"href": "/requisitions/{id}",
            "rel": "/linkRelations/tbeRequisition/create"},
        "create":
            {"href": "/requisitions",
            "rel": "/linkRelations/tbeRequisition/create"},
        "delete":
            {"href": "/requisitions/{id}",
            "rel": "/linkRelations/tbeRequisition/delete"},
        "update":
            {"href": "/requisitions/{id}",
            "rel": "/linkRelations/tbeRequisition/update"},
        "candidates":
            {"href": "/requisitions/{id}/candidates",
            "rel": "/linkRelations/tbeCandidateAgg/list"}},
    "attributes": [
        {"name": "reqId",
        "type": "integer64",
        "displayLabel": "Requisition ID",
        "displayType": "number",
        "updatable": false,
        "required": false,
        "primaryKey": true,
        "searchable": false,
        "filterable": false},
        {"name": "title",
        "type": "text",
        "displayLabel": "Title",
        "displayType": "text",
        "updatable": true,
        "required": true,
```

-continued

```
        "primaryKey": false,
        "searchable": true,
        "filterable": true},
        {"name": "location",
        "type": "text",
        "displayLabel": "Location",
        "displayType": "choiceList",
        "updatable": true,
        "required": false,
        "primaryKey": false,
        "searchable": true,
        "filterable": true,
        "lovName": "reqLocation"},
        {
        "name": "creationDate",
        "type": "date",
        "displayLabel": "Opened Date",
        "displayType": "date",
        "updatable": false,
        "required": false,
        "primaryKey": false,
        "searchable": true,
        "filterable": false}],
    "defaultSortDescriptors": [
        {"attribute": "title",
        "direction": "descending"}],
    "viewCriterias": [
        {"default": true,
        "id": "AllReqs",
        "label": "All Requisitions"},
        {"default": false,
        "id": "MyReqs",
        "label": "Requisitions I Own"}]},]}
```

Included in the metadata request, as is described above, the test system may also request collection information from the web service. One embodiment may use the HTTP command GET {domain}/{context}/{version}/{pluralResourceName} in order to access the metadata of the web service. In response, the web service could provide a JSON-formatted object (516), such as:

```
    "action": "ADD",
    "attributes":
        {"reqId": 41,
        "creationDate": "2008-12-02T12:03PST",
        "title": "Software Architect",
        "location": "San Francisco - US-CA"},
    "children": [ ],
    "groups": [
        "AllReqs",
        "MyReqs"],
    "links": {
        "details": {
            "rel": "/linkRelations/tbeRequisition/details",
            "href": "/requisitions/41"}},
    ... {more items} ...],
"listHeader": {
    "total": 56,
    "complete": true,
    "name": "tbeRequisition",
    "links": {
        "self": {
            rel": "/linkRelations/tbeRequisition/list",
            "href": "/requisitions"},
        "describedBy": {
            "rel": "/linkRelations/common/describedBy",
            "href": "/resources/tbeRequisition/model"}}}}
```

Additionally, as part of the metadata, the test server may request a link model from the web service to describe relationships between data in the web service and in other web services or the same web service. In response, the web service can provide a JSON-formatted object, such as:

```
{"relations": [
    {"name": "/linkRelations/tbeRequisition/list",
    "method": "GET",
    "description": "This link relation describes how to get
        collection of requisitions",
    "responseTypes":
        ["application/fta;
        format=application/json; schema=list; resourceName=t
        beRequisition",
        "application/json"]},
    {name": "/linkRelations/tbeRequisition/details",
    "method": "GET",
    "description": "This link relation describes how to get an
        instance of an requisition",
    "responseTypes":
        ["application/fta;
        format=application/json; schema=details;
        resourceName=tbeRequisition",
        "application/json"]},
    {"name": "/linkRelations/tbeRequisition/delete",
    "method": "DELETE",
    "description": "This link relation describes how to delete
        an instance of an requisition",
    "responseTypes":
        ["application/fta; format=application/json;
        schema=details; resourceName=tbeRequisition",
        "application/json"]},
    {"name": "/linkRelations/tbeRequisition/create",
    "method": "POST",
    "description": "This link relation describes how to create
        a new requisition",
    "requestTypes":
        ["application/fta; format=application/json;
        schema=details; resourceName=tbeRequisition",
        "application/json"],
    "responseTypes":
        ["application/fta;
        format=application/json; schema=details; resourceNam
        e=tbeRequisition","application/json"]},
    {"name": "/linkRelations/tbeRequisition/update",
    "method": "PUT",
    "description": "This link relation describes how to update
        an requisition",
    "requestTypes":
        ["application/fta; format=application/json;
        schema=details; resourceName=tbeRequisition",
        "application/json"],
    "responseTypes":
        ["application/fta; format=application/json;
        schema=details; resourceName=tbeRequisition",
        "application/json"]}]}
```

In order to deal with relationships between web service tables, the test system may generate a metadata map for the resources. A metadata map may represent a superset for an underlying set of resources. This can be a powerful tool for validating the structure of resources. In some embodiments, a metadata map can detail abstract descriptive data types defining each resource and its variables that can be part of a request or response. Different values of resources variables can represent specific data types. For example, a metadata map can be in a declarative format for "describing the structure of other data." This makes it easy to concisely describe the surface structure of data, and automate validating data against it.

After retrieving the data model, the collection information, and in some cases, a link model, the test system can begin validating the data of the web service. In order to track web service endpoints that have been visited and tested, the test service can maintain a table of visited endpoints that is populated during the testing process. When the test service begins accessing data in a particular endpoint, the endpoint can be added to the visited endpoint list (518). The testing can then proceed and data retrieved from the web service can be validated against the data model as described in detail above (520) according to a testing level. The status report for each endpoint can then be posted to an HTML report file describing the results of the test. For testing a particular web service, the GET command can use the URI of the web service and append a particular record number received in the collection data (e.g., record number 41). A command GET {domain}/{context}/{version}/{pluralResourceName}/{id} can be used, such as GET https://tbe.taleo.net/CH01/ats/api/v1/requisitions/41. An example JSON-formatted response could be:

```
{"attributes":
    {"reqId": 41,
    "creationDate": "2008-12-02T12:03PST",
    "title": "Software Architect",
    "location": "San Francisco - US-CA"},
"links":
    {"details":
        {"rel": "/linkRelations/tbeRequisition/details",
        "href": "/requisitions/41"}}}
```

Similarly, a PUT {domain}/{context}/{version}/{pluralResourceName}/{id} command can be used, such as PUT https://tbe.taleo.net/CH01/ats/api/v1/requisitions/41 {"attributes": {"title": "Senior Software Architect"}. An example JSON-formatted response returning to change the data record could be:

```
{"attributes":
    {"reqId": 41,
    "creationDate": "2008-12-02T12:03PST",
    "title": "Senior Software Architect",
    "location": "San Francisco - US-CA"},
"links":
    {"details":
        {"rel": "/linkRelations/tbeRequisition/details",
        "href": "/requisitions/41"}}}
```

Next, a POST {domain}/{context}/{version}/{pluralResourceName} command can be used, such as POST https://tbe.taleo.net/CH01/ats/api/v1/requisitions {"attributes": {"title": "Product Manager"}. An example JSON-formatted response returning the created data record could be:

```
{"attributes":
    {"reqId": 42,
    "creationDate": "2014-12-02T12:03PST",
    "title": "Product Manager",
    "location": null},
"links":
    {"details":
        {"rel": "/linkRelations/tbeRequisition/details",
        "href": "/requisitions/42"}}}
```

Finally, a DELETE {domain}/{context}/{version}/{pluralResourceName}/{id} command can be used, such as DELETE https://tbe.taleo.net/CH01/ats/api/v1/requisitions/42 to remove records.

As described above, some data records may include links to other records in the same or other web services. In order to recursively dereference these links and test these other data records, the system will determine if the referenced endpoint has already been visited (526) using the visited sites table. After all endpoints have been visited (528), the test system can prepare a pass/fail report (532) and/or prepare a demo bundle (530) as described above.

Figure 6:
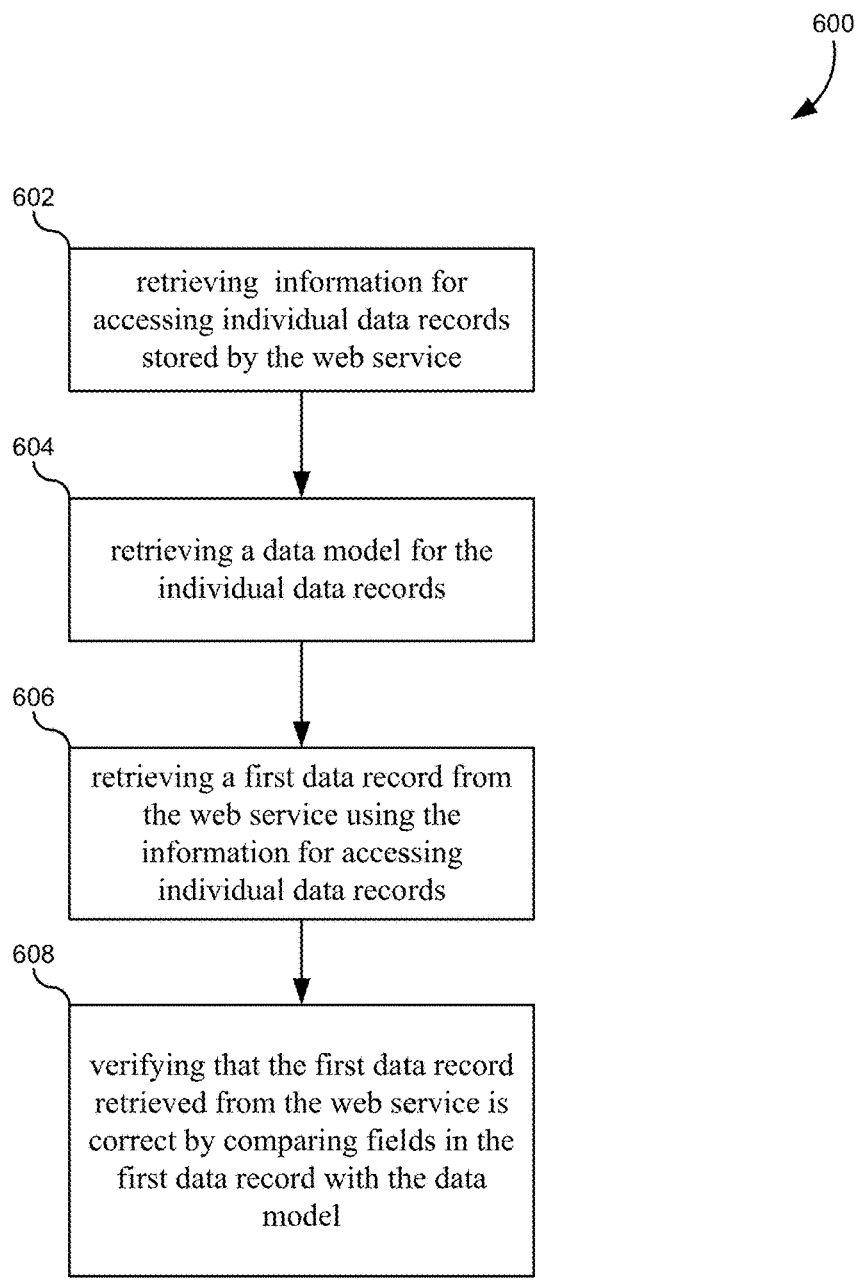
FIG. 6 illustrates a flowchart of a more general method for automatically testing a web service, according to some embodiments.

FIG. 6 illustrates a flowchart 600 of a more general method for automatically testing a web service, according to some embodiments. Briefly, flowchart 600 describes a more general method than that of flowchart 500. While the method of flowchart 500 was specific to REST endpoints, flowchart 600 may generally be applied to any web service test scenario. The method may include retrieving information for accessing individual data records stored by the web service (602). The method may also include retrieving a data model for the individual data records (604). Next, the method may include retrieving a first data record from the web service using the information for accessing individual data records (606). Finally, the method may include verifying that the first data record retrieved from the web service is correct by comparing fields in the first data record with the data model (608). In some embodiments, flowchart 600 may be augmented by successively retrieving and verifying data records from the entirety of the web service, recursively traversing any links in the data records, generating a test report, and/or generating a demo bundle as described above. Verifying that data records are correct may include any of the CRUD operations described above.

It should be appreciated that the specific steps illustrated in FIGS. 5-6 provide particular methods of testing a web service according to various embodiments of the present invention. Other sequences of steps may also be performed according to alternative embodiments. For example, alternative embodiments of the present invention may perform the steps outlined above in a different order. Moreover, the individual steps illustrated in FIGS. 5-6 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system, such as computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 7:
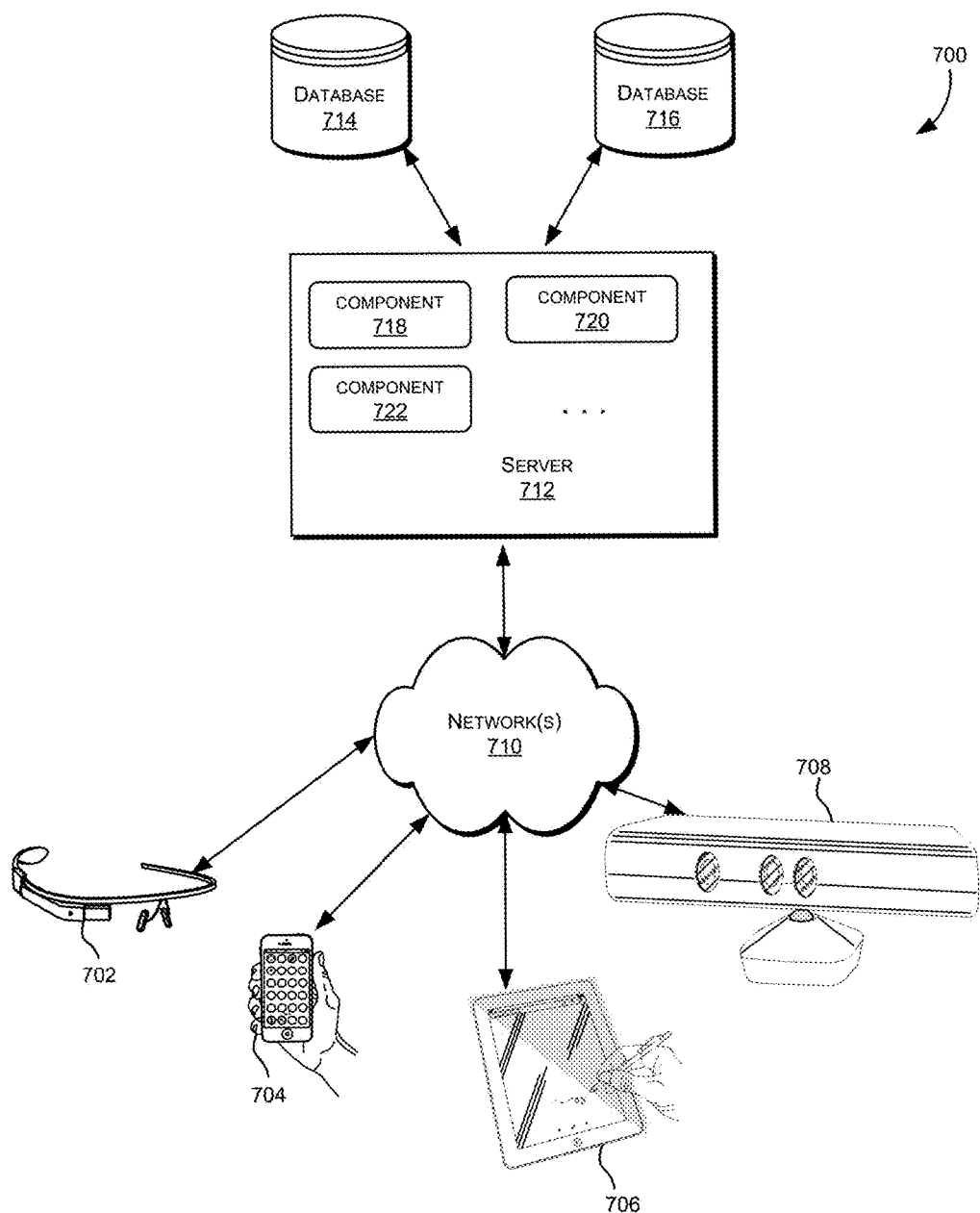
FIG. 7 illustrates a simplified block diagram of a distributed system for implementing some of the embodiments.

FIG. 7 depicts a simplified diagram of a distributed system 700 for implementing one of the embodiments. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various embodiments, server 712 may be adapted to run one or more services or software applications provided by one or more of the components of the system. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in the figure, the software components 718, 720 and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in the figure is thus one example of a distributed system for implementing an embodiment system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 712 may be adapted to run one or more services or software applications described in the foregoing disclosure. For example, server 712 may correspond to a server for performing processing described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle, that are adapted to store, update, and retrieve data in response to SQL-formatted commands.

Figure 8:
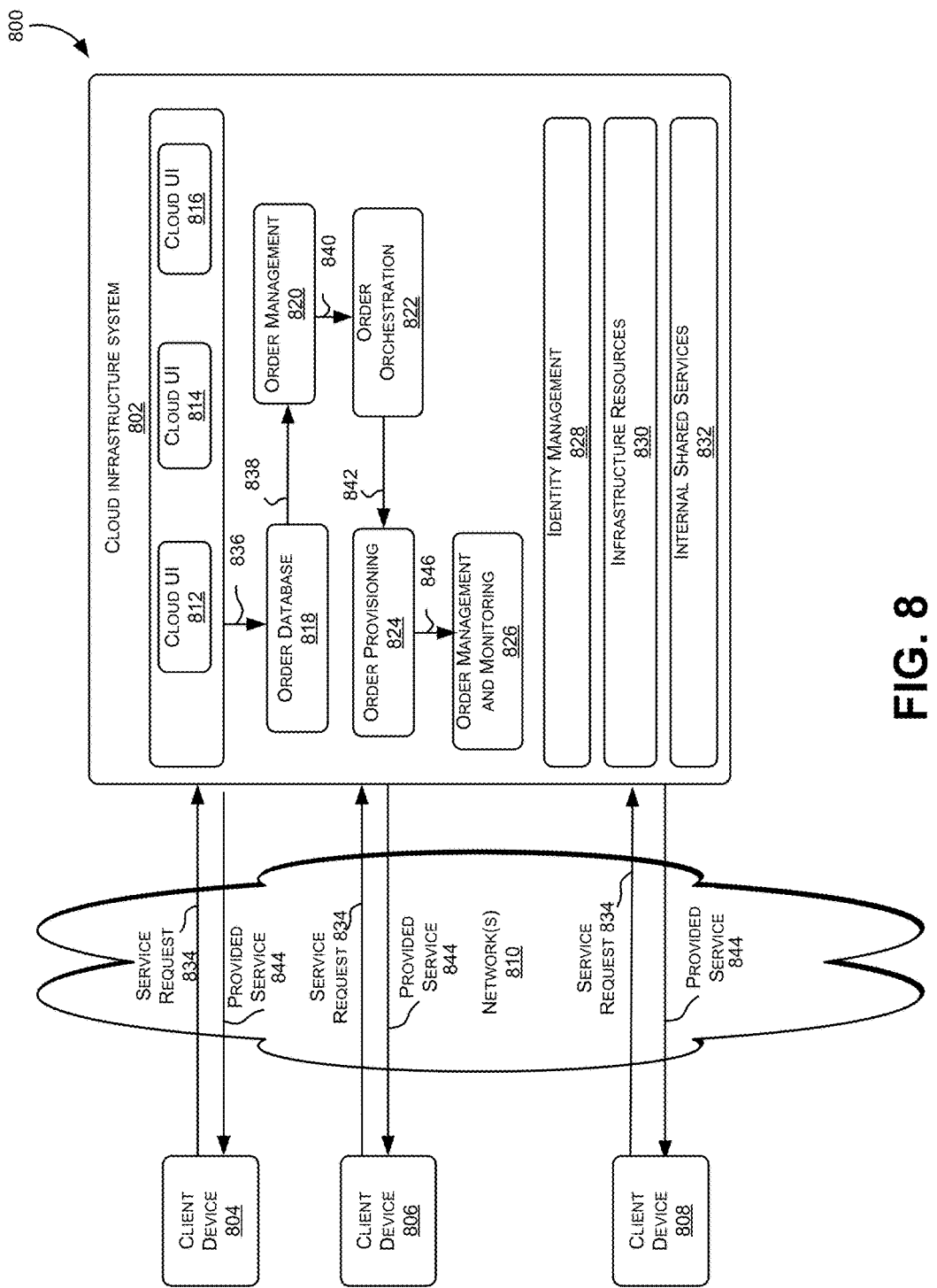
FIG. 8 illustrates a simplified block diagram of components of a system environment by which services provided by the components of an embodiment system may be offered as cloud services.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708.

Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 710.

Cloud infrastructure system 802 may comprise one or more computers and/or servers that may include those described above for server 712.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In exemplary operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816.

At operation 836, the order is stored in order database 818. Order database 818 can be one of several databases operated by cloud infrastructure system 818 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 800 may include an identity management module 828. Identity management module 828 may be configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
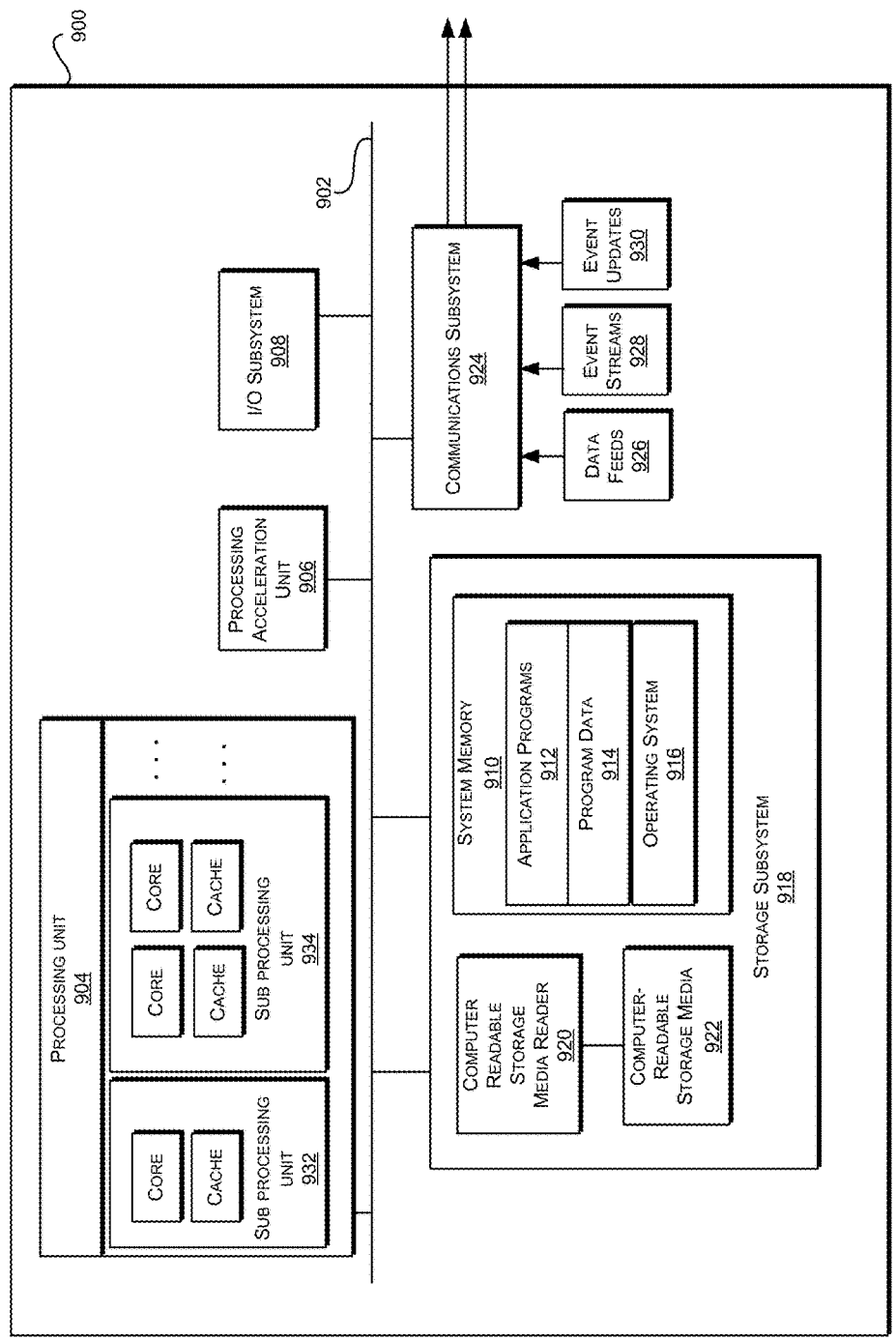
FIG. 9 illustrates an exemplary computer system, in which various embodiments may be implemented.

FIG. 9 illustrates an exemplary computer system 900, in which various embodiments of the present invention may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present invention.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of automated testing of a Web Service public interface, the method comprising:
retrieving, by a test system over a network, a first data set from a Web Service, wherein the first data set comprises a collection of record identifiers for each of a plurality of individual data records stored by the Web Service, wherein the Web Service provides a method that accepts one or more record identifiers and returns one or more corresponding data records;
retrieving, by the test system over the network, a second data set from the Web Service, the second data set comprising a data model that defines characteristics of each field in the individual data records;
successively iterating through the collection of record identifiers, and for each record identifier in the collection of record identifiers:
retrieving, by the test system over the network, a corresponding data record from the Web Service using the record identifier and the method that accepts one or more record identifiers and returns one or more corresponding data records; and
verifying, by the test system, that the corresponding data record retrieved from the Web Service is correct by comparing characteristics of fields in the corresponding data record with the characteristics defined by the data model.

2. The method of claim 1, further comprising:
determining, by the test system, that a first field in the corresponding data record comprises one or more references to data records provided by one or more additional Web Services; and
recursively traversing, by the test system, each of the one or more references to data records until each of the one or more additional Web Services have been tested.

3. The method of claim 1, further comprising verifying, by the test system, that the Web Service correctly retrieved the corresponding data record by comparing data types of the fields in the first data record with data types from the second data set.

4. The method of claim 1, further comprising:
determining, by the test system, that a first field in the corresponding data record is required according to the data model; and
verifying, by the test system, that the first field is associated with a valid value.

5. The method of claim 1, further comprising:
generating, by the test system, a demo data bundle that is stored in a local memory.

6. The method of claim 5, further comprising:
operating a software application, wherein the software application comprises a first operating mode where the software application accesses the Web Service to retrieve data records, and wherein the software application comprises a second operating mode where the software application accesses the local memory to retrieve data records from the demo data bundle.

7. A non-transitory, computer-readable medium comprising instructions that, when executed by one or more processors, causes the one or more processors to perform operations comprising:
retrieving a first data set from a Web Service, wherein the first data set comprises a collection of record identifiers for each of a plurality of individual data records stored by the Web Service, wherein the Web Service provides a method that accepts one or more record identifiers and returns one or more corresponding data records;
retrieving a second data set from the Web Service, the second data set comprising a data model that defines characteristics of each field in the individual data records;
successively iterating through the collection of record identifiers, and for each record identifier in the collection of record identifiers:
retrieving a corresponding data record from the Web Service using the record identifier and the method that accepts one or more record identifiers and returns one or more corresponding data records; and
verifying that the corresponding data record retrieved from the Web Service is correct by comparing characteristics of fields in the corresponding data record with the characteristics defined by the data model.

8. The non-transitory computer-readable medium according to claim 7 wherein the instructions cause the one or more processors to perform additional operations comprising:
determining that a first field in the corresponding data record comprises one or more references to data records provided by one or more additional Web Services;
recursively traversing each of the one or more references to data records until each of the one or more additional Web Services have been tested.

9. The non-transitory computer-readable medium according to claim 7 wherein the instructions cause the one or more processors to perform additional operations comprising verifying that the Web Service correctly retrieved the corresponding data record by comparing data types of the fields in the first data record with data types from the second data set.

10. The non-transitory computer-readable medium according to claim 7 wherein the instructions cause the one or more processors to perform additional operations comprising:
generating a demo data bundle that is stored in a local memory.

11. The non-transitory computer-readable medium according to claim 10 wherein the instructions cause the one or more processors to perform additional operations comprising:
operating a software application, wherein the software application comprises a first operating mode where the software application accesses the Web Service to retrieve data records, and wherein the software application comprises a second operating mode where the software application accesses the local memory to retrieve data records from the demo data bundle.

12. A system comprising:
one or more processors; and
one or more memory devices comprising instructions which, when executed by the one or more processors, cause the one or more processors to perform operations comprising:
retrieving a first data set from a Web Service, wherein the first data set comprises a collection of record identifiers for each of a plurality of individual data records stored by the Web Service, wherein the Web Service provides a method that accepts one or more record identifiers and returns one or more corresponding data records;
retrieving a second data set from the Web Service, the second data set comprising a data model that defines characteristics of each field in the individual data records;
successively iterating through the collection of record identifiers, and for each record identifier in the collection of record identifiers:
retrieving a corresponding data record from the Web Service using the record identifier and the method that accepts one or more record identifiers and returns one or more corresponding data records; and
verifying that the corresponding data record retrieved from the Web Service is correct by comparing characteristics of fields in the corresponding data record with the characteristics defined by the data model.

13. The system of claim 12 wherein the instructions further cause the one or more processors to perform additional operations comprising:
determining that a first field in the corresponding data record comprises one or more references to data records provided by one or more additional Web Services;
recursively traversing each of the one or more references to data records until each of the one or more additional Web Services have been tested.

14. The system of claim 12 wherein the instructions further cause the one or more processors to perform additional operations comprising:
generating a demo data bundle that is stored in a local memory.

15. The system of claim 14 wherein the instructions further cause the one or more processors to perform additional operations comprising:
operating a software application, wherein the software application comprises a first operating mode where the software application accesses the Web Service to retrieve data records, and wherein the software application comprises a second operating mode where the software application accesses the local memory to retrieve data records from the demo data bundle.

16. The non-transitory computer-readable medium according to claim 7, wherein the instructions cause the one or more processors to perform additional operations comprising:
determining that a first field in the first data record is required according to the data model; and
verifying that the first field is associated with a valid value.

17. The system of claim 12 wherein the instructions further cause the one or more processors to perform additional operations comprising:
determining that a first field in the first data record is required according to the data model; and
verifying that the first field is associated with a valid value.

18. The method of claim 1, further comprising:
altering, by the test system, a first field in the corresponding data record, wherein a data type from the second data set for the first field indicates that the first field is not updateable;
updating, by the test system through the network, the corresponding data record in the Web Service with the altered first field;
retrieving, by the test system through the network, the corresponding data record from the Web Service; and
verifying, by the test system, that the first field in the corresponding data record is not altered.

19. The non-transitory computer-readable medium according to claim 7, wherein the instructions cause the one or more processors to perform additional operations comprising:
altering a first field in the corresponding data record, wherein a data type from the second data set for the first field indicates that the first field is not updateable;
updating the corresponding data record in the Web Service with the altered first field;
retrieving the corresponding data record from the Web Service; and
verifying that the first field in the corresponding data record is not altered.

20. The system of claim 12 wherein the instructions further cause the one or more processors to perform additional operations comprising:
- altering a first field in the corresponding data record, wherein a data type from the second data set for the first field indicates that the first field is not updateable;
- updating the corresponding data record in the Web Service with the altered first field;
- retrieving the corresponding data record from the Web Service; and
- verifying that the first field in the corresponding data record is not altered.

* * * * *

UNITED STATES PATENT AND TRADEMARK OFFICE
CERTIFICATE OF CORRECTION

PATENT NO. : 10,361,944 B2
APPLICATION NO. : 14/681996
DATED : July 23, 2019
INVENTOR(S) : Chavda et al.

Page 1 of 1

It is certified that error appears in the above-identified patent and that said Letters Patent is hereby corrected as shown below:

In the Drawings

On sheet 2 of 9, in FIG. 2, under Reference Numeral 218, Line 1, delete "Reponse(s)" and insert -- Response(s) --, therefor.

Signed and Sealed this
Twenty-eighth Day of July, 2020

Andrei Iancu
*Director of the United States Patent and Trademark Office*